July 23, 1935.  LA VERN E. THOMAS  2,008,881
MOTION PICTURE PROJECTING AND SOUND REPRODUCING APPARATUS
Filed June 1, 1931  2 Sheets-Sheet 1
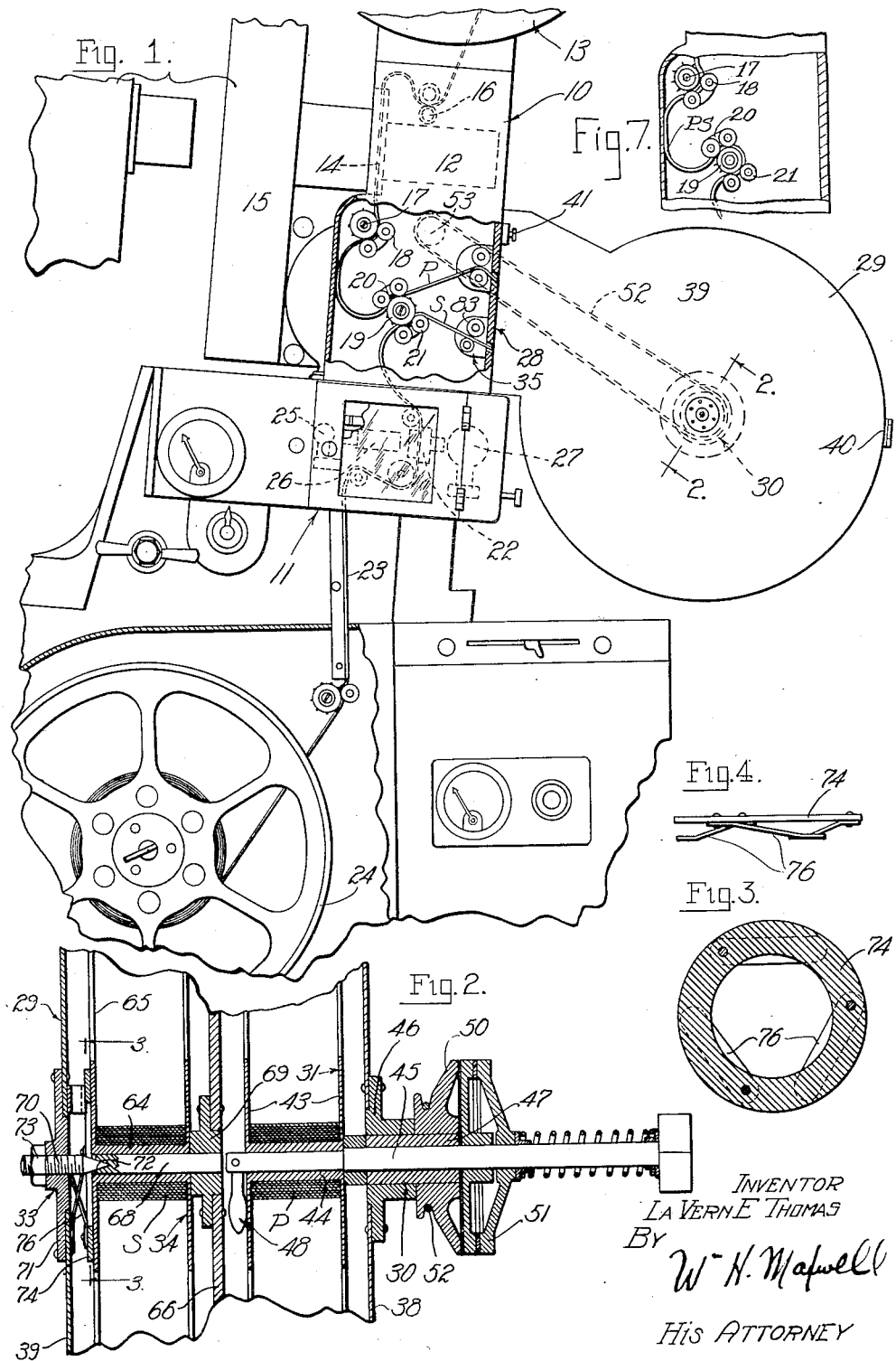

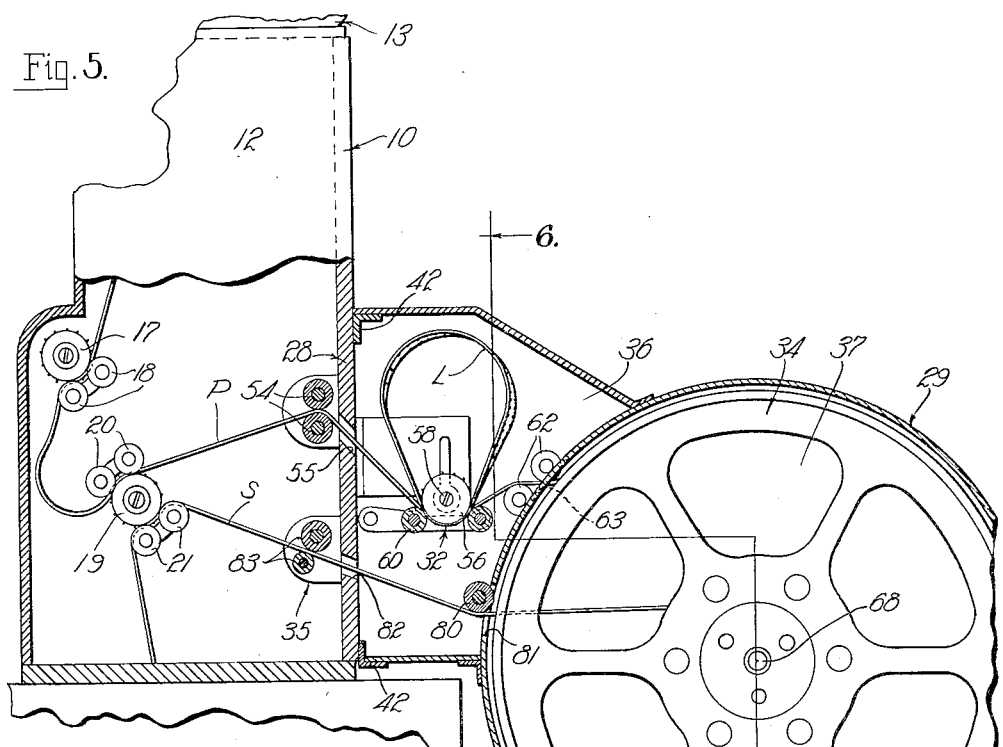
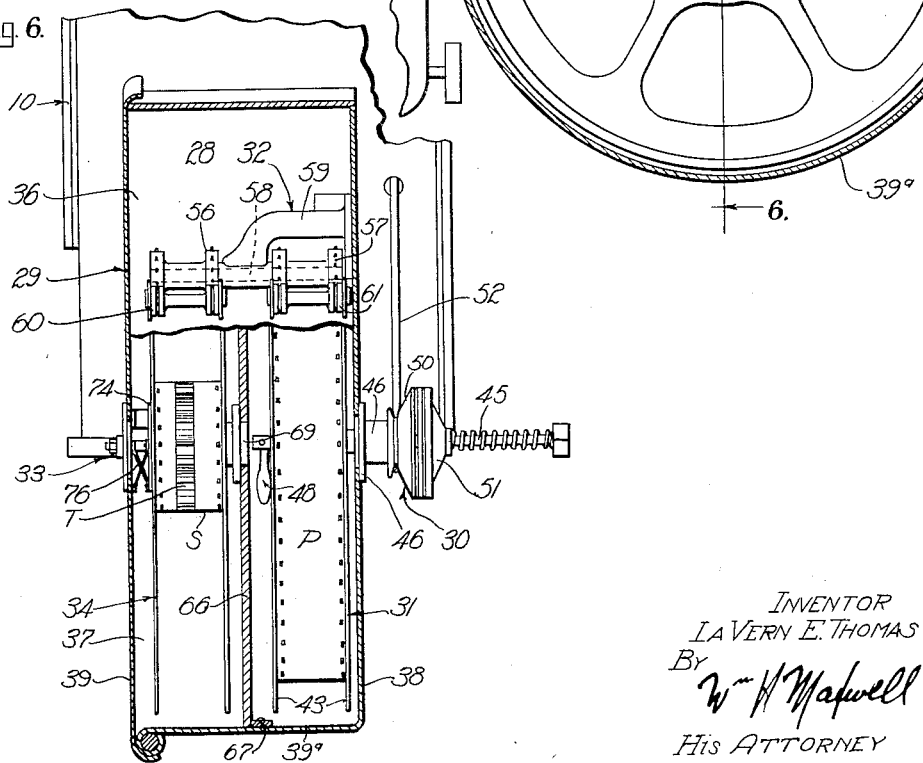

Patented July 23, 1935

2,008,881

UNITED STATES PATENT OFFICE 2,008,881

MOTION PICTURE PROJECTING AND SOUND REPRODUCING APPARATUS

La Vern E. Thomas, Los Angeles, Calif., assignor to Electrical Research Products Inc., Los Angeles, Calif., a corporation of Delaware Application June 1, 1931, Serial No. 541,338

23 Claims. (Cl. 88—16.2)

This invention relates to motion picture apparatus, and relates more particularly to a motion picture projecting and sound reproducing set or mechanism for producing sound, music, and speech in conjunction with the projection of motion pictures. It is a general object of the present invention to provide a simple, practical, and improved means for handling the film in apparatus of the character just referred to.

The present invention is concerned primarily with the handling of "sound film" or motion picture film where the sound record is photographed on a film strip. In the production of sound film, the picture records and sound records are first photographed simultaneously on separate strips of film. At the trial showing of the pictures in the studio and at theatre previews, the two individual strips of film are handled separately in the projector and sound reproducer which are properly synchronized. After the trial or preview runs, sections or parts may be cut from the films, and the completed or "theatre sound films" are printed, each bearing both the picture records and the sound records. The "theatre sound film" carries the picture records in a longitudinal series of frames or picture areas, and the sound record or sound track along one of its edges, which consists of minute spaced lines of varying densities. The usual picture projecting and sound reproducing apparatus employed in theatres are designed to handle only the completed or "theatre sound film" bearing both the picture records and the sound records. While special projecting and sound reproducing equipment has been developed for handling the picture film and sound film separately, the standard theatre apparatus must be materially modified to handle the individual film strips in the event it is desired to preview the picture. Further, the special sound and projection equipment must be materially altered to handle the completed "theatre film" bearing both the picture records and the sound records.

An object of the present invention is to provide a motion picture projector and sound reproducer set capable of handling both the picture or cinematographic records and sound records on a single film strip or on individual film strips.

An important object of the present invention is to provide an attachment capable of application to a typical theatre projecting and sound reproducing set that adapts the set for handling the picture records and sound records on individual film strips, as well as on the "theatre sound film" bearing both the picture records and sound records.

Another object of the invention is to provide an attachment of the character mentioned that may be easily and quickly installed on the projecting and sound reproducing apparatus.

Another object of the invention is to provide an attachment of the character mentioned that does not in any manner interfere with the construction or operation of the common or standard equipment for handling the "theatre sound picture film" bearing both the picture and sound records.

Another object of the invention is to provide an attachment of the character mentioned that is simple and inexpensive of manufacture and that is positive and dependable in its operation.

Another object of the invention is to provide an apparatus of the character mentioned in which the film may be easily and quickly threaded or arranged for the proper synchronous production of the pictures and sound.

A further object of the invention is to provide an attachment of the character mentioned that includes means for mounting and operating a receiving reel for receiving the picture film from the projector and means for carrying a supply reel for the sound film so that, when the separate or individual film strips are used, the picture film is taken up or reeled up before passing through the sound reproducing mechanism, while the sound film is fed through the sound reproducing mechanism in the proper synchronism with the picture film without passing through the projector.

Other objects and features of the invention will be best and more fully understood from the following detailed description of a typical form and application of the invention, throughout which description reference will be had to the accompanying drawings, in which:

Fig. 1 is a side elevation of the principal parts of a typical projector and sound reproducing set with portions of the case broken away to show the internal mechanism and illustrating the attachment provided by the present invention mounted thereon. Fig. 2 is an enlarged detailed sectional view of the reel mounting and operating means embodied in the present invention, being a view taken as indicated by line 2—2 on Fig. 1. Fig. 3 is a sectional view of a spring-carrying ring, being a view taken substantially as indicated by line 3—3 on Fig. 2. Fig. 4 is a side elevation or edge elevation of the ring illustrated in Fig. 3. Fig. 5 is an enlarged vertical detailed sectional view of the attachment provided by the present invention, illustrating it mounted on the projector head or turret and showing a portion of the projector head in vertical section. Fig. 6 is a detailed sectional view taken substantially as indicated by line 6—6 on Fig. 5. Fig. 7 is a side elevation of a typical projector showing the normal path of the film having both pictures and sound effects thereon.

The present invention is capable of embodiment in attachments for use on various types of equipment, as well as embodiment in the equipment or apparatus as initially manufactured. Throughout the following detailed disclosure, the invention will be described embodied in the form of an attachment for application to a standard or typical theatre sound film projecting and reproducing apparatus. It is to be understood, however, that the invention is not to be taken as limited or restricted to the specific form or application about to be described, but that it is to be taken as including any features or modifications that may fall within the scope of the claims.

In order to facilitate a clear understanding of the invention, I will proceed with a more or less general description of the typical picture projecting and sound reproducing apparatus illustrated in the drawings. The typical projector and sound reproducing set illustrated in the drawings includes, generally, a projector head 10, and a base 11 carrying the sound reproducing mechanism.

The projector head 10 includes a case 12 for containing the mechanism of the projector and a film magazine 13 mounted on the upper end of the case for carrying the film to be handled or run through the projector. A film gate 14 is mounted in the rear of the case 12, and a light shutter 15 is mounted at the rear of the case 12 for controlling the passage of light through the gate 14. The film is adapted to pass downwardly into the case 12 from the magazine 13, and suitable guide rolls 16 are provided within the case 12 for handling the film. In accordance with the standard practice, an intermittently rotated feed sprocket 17 is provided in the case 12 below the gate 14 to draw or feed the film through the gate 14. Spaced rolls 18 are provided to maintain the film in proper co-operation with the intermittently operated feed sprocket 17. A control or synchronizing sprocket 19 is provided within the case 12 at a point spaced below the intermittent feed sprocket 17. The sprocket 19 is continuously rotated at a speed bearing a definite relationship to the speed of the intermittent movement of the feed sprocket 17 and is provided to ensure the continuous passage of the film into the sound base 11. In practice, a slack or loop portion is provided in the film between the sprockets 17 and 19 to permit the sprocket 19 to continuously advance the film. Sets or pairs 20 and 21 of spaced rollers are mounted at the diametrically opposite sides of the control sprocket 19 to ensure the proper engagement of the film with the sprocket. When handling the "theater sound film PS" bearing both the picture and sound records, the film is passed downwardly from the sprocket 19 into the sound reproducing base 11 as shown in Fig. 7.

The sound reproducing apparatus includes the case or base 11 upon which the projector head 10 is mounted and which contains the reproducing mechanism. A light gate and film guide or chute 22 is provided within the base 11 to pass the film downwardly. A guide or chute 23 is provided to receive the film after its passage through the case 11, and a receiving reel 24 takes or reels up the film after its passage through the guide 23. An exciting lamp 25 is mounted within the base 11 for passing light through a lens tube 26 and through the film at the gate 22. A photo-electric cell 27 is provided in front of the gate 22 to be acted upon by the light passing through the film to control the amplifiers, sound reproducing devices, etc. Numerous controls, and the like, are provided on the sound reproducing mechanism; however, the present invention is not primarily concerned with the operation or adjustment of the sound reproducing mechanism, and a description of its controls is believed unnecessary. The apparatus thus far described is typical equipment for handling the usual "theatre sound film", that is, a film strip carrying both the picture records and sound records such as PS shown in Fig. 7. The "theatre sound film" is moved downwardly through the gate 14 by the intermittent sprocket 17 so that the light is projected through its pictures or frames. After leaving the intermittently operated sprocket 17, the film passes over the continuously rotating control sprocket 19 which provides for its constant movement downwardly through the gate 22 of the sound reproducing mechanism where the light projected through its sound track controls the operation of the photo-electric cell 27. In order to properly synchronize the projected pictures and the sound, the picture records or frames and the sound records must bear a definite relationship to one another on the film. In practice, the sound records are spaced from 17 to 19 picture frames or picture areas ahead of the picture records so that a sound record, taken simultaneously with a given picture record, will pass through the gate 22 at the same time or approximately simultaneously with the passage of the said picture through the gate 14. It will be apparent that the apparatus just described is not adapted to or capable of handling individual or separate picture film and sound film and that it would require considerable alteration and modification to adapt it for such operation.

The device or attachment provided by the present invention is adapted to be mounted on the projector head 10 for converting the sound picture apparatus for handling separate sound and picture films and includes, generally, a plate 28 to form the front plate of the head case 12, a housing 29 carried by the plate 28, means 30 for mounting and rotating a receiving reel 31 for receiving or reeling up the picture film P after it has passed through the projector head 10, means 32 for guiding the picture film P from the control sprocket 19 to the receiving reel 31, means 33 for mounting a supply reel 34 in the housing 29 for carrying the sound film S, and means 35 for guiding the film S from the reel 34 to the control sprocket 19.

The plate 28 is intended to be mounted in the front of the head case 12 to replace the regular front plate forming part of the standard equipment. It will be apparent how the plate 28 may be constructed for ready assembling or mounting on the case 12. The plate 28 may be provided with means for carrying the lens tube of the projector and any other devices that may be mounted on the front plate forming a part of the usual equipment.

The housing 29 is mounted on the front of the plate 28 and is provided to house the reels 31 and 34 and the guide means 32. In accordance with the broader aspects of the invention, the housing 29 may be varied considerably in construction and shape. The particular housing illustrated in the drawings includes an inner portion 36 rectangular in its general configuration and an outer portion 37 of circular shape for carrying the reels 31 and 34. The opposite sides of the housing 29 may be vertical and parallel and one side 38 may be rigid or integral with the edge or peripheral part 39ª. In accordance with the preferred construction, the other side 39 of the housing is in the nature of a closure or door, and is adapted to be swung to an open position so that the interior of the housing is readily accessible. In the particular case illustrated in the drawings, the door side 39 of the housing is hinged at 40 to the peripheral part 39ª and is normally retained in the closed position by suitable latch 41 on the front plate 28. The housing 29 may be secured to the front plate 28 by angle irons 42 or other suitable means.

The means 30 for mounting and operating the picture film receiving reel 31 is provided to mount the reel 31 within the housing 29 and to continuously rotate it so as to take up the film after it leaves the control sprocket 19. The reel 31 may be a common or typical film reel having spaced perforated sides 43 projecting from a tubular hub 44. The means 30 includes a shaft 45 extending through a central boss or bearing 46 on the rigid side 38 of the housing. The shaft 45 is mounted in the bearing 46 through a free bushing 47 and projects into the housing and through the tubular hub 44 of the reel. Suitable means 48 may be provided on the inner end of the shaft 45 for releasably retaining the reel 31 on the shaft. The various parts of the attachment are related and proportioned so that the diametric axis of the reel 31 is offset from the diametric axis of the control sprocket 19, or, more properly, is offset horizontally from the vertical plane coincident with the diametric axis of the control sprocket 19.

The means for operating or rotating the receiving reel 31 may be similar to the reel operating means commonly employed in the art. A pulley 50 is rotatably mounted on the bushing 47 and is operatively connected with the shaft 45 through a suitable slip clutch connection 51 that permits the reel 31 to drag when the reeled film P becomes of large diameter. The pulley 50 is adapted to be rotated by the operating mechanism of the projector head 10 so as to provide for the proper speed of rotation of the reel 31. In practice, a belt 52 may pass over the pulley 50 and a pulley 53, driven by the operating mechanism in the projector head 10.

The means 32 for guiding the picture film P from the sprocket 19 to the reel 31 includes a pair of guide rollers 54 mounted at the inner side of the front plate 28. The picture film P passes upwardly and outwardly from the continuously rotating sprocket 19 and passes outwardly from between the guide rolls 54. An opening 55 is provided in the front plate 28 to pass the picture film P downwardly and forwardly into the inner portion 36 of the housing. The invention provides a novel and improved means for offsetting the direction of travel of the picture film P from the vertical plane of the sprocket 19 to the central vertical plane of the receiving reel 31.

The means for offsetting the picture film P as it passes from the sprocket 19 to the reel 31 includes two spaced sprockets 56 and 57 mounted within the inner part 36 of the housing. The two sprockets 56 and 57 are fixed on a common or single shaft 58 rotatably carried by a suitable bracket 59 in the housing 29. The shaft 58 is rotatable about a horizontal axis, and the sprockets 56 and 57 are spaced apart horizontally and are in direct horizontal alignment. The sprocket 56 has a central diametric axis in the same vertical plane as the diametric or active axis of the control sprocket 19, while the sprocket 57 has a central diametric axis in the same vertical plane as that of the reel 31. In accordance with the standard practice, the sprockets 56 and 57 are provided at their peripheries with spaced teeth for co-operating with the perforations of the film. The sprockets 56 and 57 are fixed on the shaft 58 so as to operate or rotate in unison. The film P carrying the picture records passes downwardly under the sprocket 56 and then upwardly from the sprocket 56. Spaced pairs of rollers 60 are provided to ensure the proper co-operation of the film with the toothed sprocket 56. The film passes upwardly from the sprocket 56, then rearwardly, and then downwardly, so that a comparatively large loop L is formed. The loop L is bent or distorted laterally and has its inner end in co-operation with the sprocket 57. The film passes under the sprocket 57 and is retained in proper engagement with the sprocket by spaced rollers 61. The loop L of film is bent or distorted laterally and has its opposite ends engaged by the spaced sprockets 56 and 57 so that the film passing forwardly from the sprocket 57 is offset horizontally from the film passing to the sprocket 56. The film passing forwardly from the sprocket 57 has its central longitudinal axis in the same vertical plane as the active or diametric axis of the receiving reel 31. In practice, it is preferred to thread the film P so that the loop L is comparatively large to eliminate any danger of the film becoming strained or permanently distorted. Spaced guide rollers 62 are provided to guide the film P through an opening 63 in the periphery 39ª of the circular part of the housing. The film P passes through the opening 63 onto the receiving reel 31. During operation the rotation of the reel 31 maintains that part of the film P between the sprocket 19 and the reel 31, with the exception of the loop L, taut. As the two sprockets 56 and 57 are mounted on a common shaft to rotate in unison, the loop L is always maintained. It will be apparent how the horizontally spaced toothed sprockets 56 and 57 offset the film P so that it effectively passes from the constantly rotating sprocket 19 to the receiving reel 31.

The means 33 is provided to rotatably mount the feed or supply reel 34 within the housing 29. The reel 34 carries the film S bearing the sound records or track T and may be a common or typical film reel having a tubular hub 64 and spaced radial sides 65. In accordance with the invention, the reel 34 is mounted within the circular portion 37 of the housing to have its diametric axis in the same vertical plane as that of the sprocket 19. The means 33 for rotatably mounting the reel 34 in the housing includes a circular partition 66 arranged in the housing 29 between the reels 31 and 34. The partition 66 is removable and its inward movement in the housing is limited by stops 67. A central trunnion shaft 68 may be carried by a suitable boss 69 mounted on the partition 66, and the end of the reel 34 is adapted to bear against the boss 69. Means is provided on the hinged side or door 39 of the housing for supporting the outer end of the trunnion 68. A pin 70 is screw-threaded through an opening in a plate 71 to project into the housing. The inner end of the pin 70 is pointed and is adapted to fit into a socket 72 in the end of the trunnion shaft 68. A nut 73 may be threaded on the pin 70 to lock it in the proper position.

Means is provided for yieldingly resisting rotation of the reel 34 to provide for the proper unwinding of the film S. A ring 74 is mounted on the outer end of the reel 34. The ring 74 carries leaf springs 76 adapted to pressurally bear against the end plate 71 to normally hold the end of the reel in pressural and frictional engagement with the boss 69.

The means 35 for guiding the film S from the reel 34 to the sprocket 19 includes a guide roller 80 rotatably mounted adjacent an opening 81 in the periphery of the circular housing part 39a. The film S passes forwardly under the roller 80 through an opening 82 in the front plate 28. Spaced guide rollers 83 are mounted on the inner side of the plate 28 to guide the film S as it passes upwardly and rearwardly into engagement with the continuously rotating sprocket 19. The film S bearing the sound record or track T is passed between the rollers 21 and the sprocket 19 and is fed downwardly into the base 11 for movement through the gate 22.

It is believed that the practicability and operation of the device provided by the present invention will be readily apparent from the foregoing detailed description. It is believed apparent how the "theatre sound film" bearing both the picture records and the sound records is handled or passed through the projector head 10 and the sound reproducing base 11 in the usual manner. If it is desired to run individual picture film P and sound film S through the apparatus, the picture film P is threaded in the manner illustrated in Fig. 5 of the drawings. As the closure side 39 of the housing may be opened and the reel 34 and partition 66 removed, the reel 31 may be readily mounted in the housing for operation. The picture film P is threaded over the continuously rotating sprocket 19 and under the spaced sprockets 56 and 57. A loop L is provided above the sprockets 56 and 57, as described above, and film S is then threaded between the roller 62 and passed on to the reel 31. The film S bearing the sound track T is threaded between the guide rollers 83 and under the sprocket 19. After being threaded between the rollers 21 and the sprocket 19, the film S is arranged through the base 11 in the usual manner and threaded through the chute 23 so as to be received by the reel 24. During operation, the constant or continuously rotating sprocket 19 operates to provide for the synchronous movement of the two films P and S. It is to be understood that the sprocket 19 is rotated in a definite manner with respect to the intermittent operation of the sprocket 17. It is to be noted that the present invention provides an attachment for converting the usual projector and sound reproducer set to handle separate film strips P and S bearing the picture records and sound records. The attachment is simple and inexpensive of manufacture and is easily applied to the usual equipment. The attachment does not in any manner interfere with or complicate the standard equipment for handling the sound or theatre film and is such that the individual film strips P and S may be easily and quickly threaded in the apparatus for operation.

Having described only a typical, preferred form of the invention, I do not wish to limit myself to the specific details set forth, but wish to reserve to myself all changes and variations that may appear to those skilled in the art or fall within the scope of the following claims:

Having described my invention, I claim:

1. In combination, a sound picture apparatus arranged to drive a film with sound and picture thereon past sound translating mechanism and picture lenses, said sound picture apparatus being mounted in an encasement and having a film moving sprocket, an attachment for converting said sound picture apparatus for driving separate sound and picture films respectively past said sound translating mechanism and picture lenses, said attachment comprising a housing removably attached to said encasement, said housing having therein two additional reels for handling said separate films and means for guiding said films between said sound picture apparatus and the reels of said attachment.

2. An attachment for apparatus comprising a projector having a case and a sound reproducing mechanism, which attachment includes a plate removably attached to the case to form the front of the projector case, a housing carried by the plate, means for mounting a reel in the housing to receive a film after its passage through the projector, means in the housing for guiding the said film from the projector case to the reel, means for mounting a reel in the housing to supply film to the sound reproducing mechanism, and means carried by the plate for guiding the last mentioned film through the housing into the projector case.

3. An attachment for a projector and sound reproducing apparatus having a case and a control film sprocket in the case, which attachment includes, a mounting plate to be attached to the case, a housing on the plate, means for mounting a reel in the housing to have a diametric axis in the same plane as that of the sprocket, means carried by the plate for guiding a film from said reel to the sprocket, means for mounting a reel in the housing to rotate in a plane spaced from and parallel with said plane, and means in the housing for guiding film from the sprocket to the last-mentioned reel.

4. An attachment for a projector and sound reproducing film apparatus having a case and a control film sprocket in the case, which attachment includes, a mounting plate to be attached to the case, a housing on the plate, means for mounting a reel in the housing to have a diametric axis in the same plane as that of the sprocket, means for guiding a film from said reel to the sprocket, means for mounting a reel at one side of the first-mentioned reel to have its diametric axis parallel with that of the first mentioned reel, and means in the housing for guiding film from the sprocket to the last-mentioned reel, including two spaced sprockets rotatable in unison, one of said sprockets being in alignment with the control sprocket, the other being in alignment with the second-mentioned reel.

5. An attachment for a picture projecting and sound reproducing film apparatus having a case with a removable front plate and a control film sprocket in the case, which attachment includes, a mounting plate adapted to replace the front plate of the apparatus, a housing on the mounting plate, means for mounting a reel in the housing to have a diametric axis in the same plane as that of the sprocket, means carried by the mounting plate for guiding a film from said reel to the sprocket, means for mounting a reel at one side of the first-mentioned reel, and means in the housing for guiding film from the sprocket to the last-mentioned reel.

6. An attachment for a picture projecting and sound reproducing apparatus having a case and a control film sprocket, which attachment includes, a mounting plate to be attached to the case, a housing on the plate, means for mounting two reels in the housing to rotate in spaced parallel planes, one of the reels having a diametric axis in the same plane as that of the sprocket, means carried by the plate for guiding a film from said reel to the sprocket, and means in the housing for guiding film from the sprocket to the other reel, including two sprockets rotatable in unison in spaced parallel planes, one of said sprockets being in alignment with the control sprocket, the other being in alignment with the said other reel, and means for holding the film in co-operation with the two spaced sprockets whereby a laterally distorted loop may be maintained in the portion of film passing between the spaced sprockets.

7. An attachment for a picture projecting and sound reproducing apparatus having a case and a control film sprocket, which attachment includes, a mounting plate to be attached to the case, a housing on the plate, means for mounting two reels in the housing to rotate in spaced parallel planes, one of the reels having a diametric axis in the same plane as that of the sprocket, means carried by the plate for guiding a film from said reel to the sprocket, and means for guiding film from the sprocket to the other reel including, a shaft having an axis of rotation parallel with the axis of rotation of the control sprocket, two sprockets fixed on the shaft, one of said sprockets having a diametric axis in alignment with that of the control sprocket, the other sprocket being in diametric alignment with the last-mentioned reel and rollers holding the film in engagement with the sprockets to maintain a horizontally distorted loop in the film passing between the sprockets.

8. An attachment for a picture projecting and sound reproducing apparatus having a case and control film sprocket rotatable about a horizontal axis, which attachment includes, a housing adapted to be mounted on the front of the case, means for rotatably mounting a film receiving reel in the housing, means for mounting a film supply reel in the housing, the reels being rotatable about horizontal axes, one reel being in the same vertical plane as the sprocket, and the other being offset horizontally from the vertical plane of the sprocket, means for guiding film from the supply reel to the sprocket, and means for guiding film between the sprocket and the receiving reel.

9. An attachment for a picture projecting and sound reproducing apparatus having a case and a control film sprocket in the case rotatable about a horizontal axis, which attachment includes, a housing adapted to be mounted on the case, means for rotatably mounting a film receiving reel in the housing, means for mounting a film supply reel in the housing, the reels being rotatable about horizontal axes, one reel being in the same vertical plane as the sprocket, and the other being offset horizontally from the vertical plane of the sprocket, means for guiding film from the supply reel to the sprocket, and means for guiding film between the sprocket and the receiving reel including horizontally spaced film sprockets in the housing rotatable in unison.

10. An attachment for a picture projecting and sound reproducing apparatus having a case and a control film sprocket in the case rotatable about a horizontal axis, which attachment includes, a housing adapted to be mounted on the case, means for rotatably mounting a receiving film reel in the housing, means for mounting a film supply reel in the housing, the said means being such that the reels being rotatable about horizontal axes, one reel being in the same vertical plane as the sprocket, and the other being offset horizontally from the vertical plane of the sprocket, means carried by the housing for guiding film from the supply reel to the sprocket, and means in the housing for guiding film between the sprocket and the receiving reel including, a shaft mounted in the housing for rotation about a horizontal axis, and spaced film sprockets on the shaft.

11. An attachment for a picture projecting and sound reproducing apparatus having a case and a control film sprocket in the case rotatable about a horizontal axis, which attachment includes, a housing adapted to be mounted on the case, means for rotatably mounting a receiving film reel in the housing, means for mounting a film supply reel in the housing, the said means being such that the reels being rotatable about horizontal axes, one reel being in the same vertical plane as the sprocket, and the other being offset horizontally from the vertical plane of the sprocket, means carried by the housing for guiding film from the supply reel to the sprocket, means for guiding film from the sprocket to the receiving reel, including sprocket means in the housing distorting the film horizontally, and means for rotating the film receiving reel.

12. An attachment for a picture projecting and sound reproducing apparatus having a case and a control film sprocket in the case rotatable about a horizontal axis, which attachment includes, a housing adapted to be mounted on the case, means for rotatably mounting a receiving film reel in the housing, means for mounting a film supply reel in the housing, the said means being such that the reels are rotatable about horizontal axes, one reel being in the same vertical plane as the sprocket, and the other being offset horizontally from the vertical plane of the sprocket, means carried by the housing for guiding film from the supply reel to the sprocket, means for guiding film between the sprocket and the receiving reel including horizontally spaced sprockets in the housing, and spaced rollers at each sprocket holding a horizontally distorted loop in the film passing between the sprockets, and means for yieldingly resisting rotation of the supply reel.

13. In combination, a sound picture apparatus, including, a projector including a continuously rotating film sprocket, and a sound reproducing mechanism below the sprocket, and a film handling device including means for mounting two reels for rotation independently of one another, means guiding picture film passing from the projector so as to actively engage one side of the sprocket and be driven thereby in one direction onto one of the reels, means for guiding sound film from the other reel to actively engage the other side of the sprocket and be driven thereby in the opposite direction from the picture film and toward the sound reproducing mechanism, and means for rotating the reel receiving the picture film.

14. An attachment for sound picture apparatus comprising a sound reproducing mechanism and a picture projecting head above said mechanism and having a case and a continuously rotating film control sprocket in the case which attachment includes a housing removably attached to said case having mounted therein, two rotatable film reels, means for guiding picture film onto one of the reels after it has passed over the sprocket, and means for guiding sound film from the other reel into the case to come into engagement with the sprocket.

15. An attachment for sound picture apparatus comprising a sound reproducing mechanism and a picture projecting head above said mechanism and having a case and a continuously rotating film control sprocket in the case which attachment includes a plate adapted to be removably attached to the front of said case, a housing on the front of the plate for rotatably mounting two film reels for independent rotation, means incorporated in the housing and plate for guiding picture film from the sprocket to one of said reels, and means for guiding sound film from the other reel into the case to be engaged by the sprocket.

16. An attachment for sound picture apparatus comprising a sound reproducing mechanism and a picture projecting head above said mechanism and having a case and a continuously rotating film control sprocket in the case which attachment includes a plate adapted to be removably attached to the front of said case, a housing on the front of the plate for rotatably mounting two film reels for independent rotation, means incorporated in the housing and plate for guiding picture film from the sprocket to one of said reels, and means for guiding sound film from the other reel into the case to be engaged by the sprocket, the last mentioned means including a roller mounted on the plate for guiding the sound film through an opening in the plate.

17. In combination, a sound picture apparatus arranged to drive a film with sound and picture thereon past sound translating mechanism and picture lenses, said sound picture apparatus being mounted in an encasement and having a film moving sprocket, an attachment for converting said sound picture apparatus for driving separate sound and picture films respectively past said sound translating mechanism and picture lenses, said attachment comprising a housing removably attached to said encasement, said housing having therein two additional reels for handling said separate films and means for guiding said films over separate paths between said sound picture apparatus and the reels of said attachment.

18. In combination, a sound picture apparatus arranged to drive a film with sound picture thereon past sound translating mechanism and picture lenses, said sound picture apparatus being mounted in an encasement and having a film moving sprocket, an attachment for converting said sound picture apparatus for driving separate sound and picture films respectively past said sound translating mechanism and picture lenses, said attachment comprising a housing removably attached to said encasement, said housing having therein two additional reels for handling said separate films and means for guiding said films over separate paths on said sprocket leading from said sound translator and picture lenses respectively to separate paths leading to said reels.

19. In combination, a sound picture apparatus arranged to drive a film with sound and picture thereon, sound translating means and picture lenses, said sound picture apparatus being mounted in an encasement and having a film moving sprocket, an attachment for converting said sound picture apparatus for driving separate sound and picture films respectively past said sound translating mechanism and picture lenses, said attachment comprising a housing removably attached to said encasement, said housing having therein two additional reels, one being mounted in alignment with said sprocket and the other being off set, means for guiding said films over separate paths between said sound picture apparatus and the reels of said attachment including means to form a loop in one film to move it laterally into alignment with said off set reel.

20. In combination, a sound picture apparatus arranged to drive a film with sound and picture thereon past sound translating mechanism and picture lenses, said sound picture apparatus being mounted in an encasement and having a film moving sprocket, an attachment for converting said sound picture apparatus for driving separate sound and picture films respectively past said sound translating mechanism and picture lenses, said attachment comprising a housing removably attached to said encasement, said housing having therein two additional reels, one being mounted in alignment with said sprocket and the other being off set, means for guiding said films over separate paths between said sound picture apparatus and the reels of said attachment including two rollers with their axes in line laterally for guiding one film laterally into aignment with said off set reel.

21. In combination, a sound picture apparatus arranged to drive a film with sound and picture thereon past sound translating mechanism and picture lenses, said sound picture apparatus being mounted in an encasement and having a film moving sprocket, an attachment for converting said sound picture apparatus for driving separate sound and picture films respectively past said sound translating mechanism and picture lenses, said attachment comprising a housing removably attached to said encasement, said housing having therein two additional reels, one being mounted in alignment with said sprocket and the other being off set, means for guiding said films over separate paths between said sound picture apparatus and the reels of said attachment including two sprockets with their axes in line laterally for guiding one film laterally into alignment with said off set reel.

22. In combination, a sound picture apparatus arranged to drive a film with sound and picture thereon past sound translating mechanism and picture lenses, said sound picture apparatus being mounted in an encasement and having a film moving sprocket, an attachment for converting said sound picture apparatus for driving separate sound and picture films respectively past said sound translating mechanism and picture lenses, said attachment comprising a housing removably attached to said encasement, said housing having therein a take-up reel and a delivery reel, guiding means for receiving one of said films from said sprocket and guiding it onto said take-up reel and guiding means for receiving the other film from said delivery reel and guiding it to said sprocket.

23. In combination, a sound picture apparatus arranged to drive a film with sound and picture thereon past sound translating mechanism and picture lenses, said sound picture apparatus being mounted in an encasement and having a continuous motion film driving sprocket with film retaining rollers diametrically opposite, an attachment for converting said sound picture apparatus for driving separate sound and picture films respectively past said sound translating mechanism and pictures lenses, said attachment comprising a housing removably attached to said encasement, said housing having therein a take-up reel and a delivery reel and means to operate said reels and said picture apparatus in synchronism to drive one film through the agency of said sprocket and one set of rollers in one direction to said take-up reel and to drive the other film through the agency of said sprocket and the diametrically opposite rollers in the opposite direction, from said delivery reel to the sound picture apparatus.

LA VERN E. THOMAS.